(12) United States Patent
Bhamare et al.

(10) Patent No.: US 8,787,208 B2
(45) Date of Patent: Jul. 22, 2014

(54) METHOD AND APPARATUS FOR ALLOCATING BACKBONE VLAN IDENTIFIERS

(75) Inventors: Deval A. Bhamare, Dhule, IN (US); Ashwin Gumaste, Mumbai, IN (US)

(73) Assignee: Indian Institute of Technology Bombay, Mumbai (IN)

( * ) Notice: Subject to any disclaimer, the term of this patent is extended or adjusted under 35 U.S.C. 154(b) by 85 days.

(21) Appl. No.: 13/245,867

(22) Filed: Sep. 27, 2011

(65) Prior Publication Data
US 2013/0028141 A1 Jan. 31, 2013

(51) Int. Cl.
*H04L 12/28* (2006.01)
*H04L 12/54* (2013.01)

(52) U.S. Cl.
CPC ........... *H04L 12/28* (2013.01); *H04L 12/56* (2013.01)
USPC ........................................... 370/255

(58) Field of Classification Search
None
See application file for complete search history.

(56) References Cited

U.S. PATENT DOCUMENTS

| 2009/0161669 A1* | 6/2009 | Bragg et al. | 370/389 |
| 2011/0019536 A1* | 1/2011 | Kim et al. | 370/223 |

FOREIGN PATENT DOCUMENTS

| WO | WO 2005099183 | * | 4/2005 | 12/56 |

* cited by examiner

*Primary Examiner* — Huy D Vu
*Assistant Examiner* — Bao G Nguyen (57) ABSTRACT

Methods and apparatuses for allocating backbone virtual local area network identifiers (BVIDs) to connection requests in a provider backbone bridging-traffic engineering (PBB-TE) network are described. During operation, a system (e.g., a network management system) can receive a set of connection requests for a set of connections that are desired to be set up in the PBB-TE network. Next, the system can allocate a BVID to each connection request in the set of connection requests so that, once the set of connection requests are set up in the PBB-TE network, conflicting connections in the PBB-TE network have different BVIDs.

12 Claims, 7 Drawing Sheets

```
┌─────────────────────────────────────────────────────────────┐
│ RECEIVE A SET OF CONNECTION REQUESTS FOR A SET OF CONNECTIONS│
│      THAT ARE DESIRED TO BE SET UP IN A PBB-TE NETWORK       │
│                             302                              │
└─────────────────────────────────────────────────────────────┘
                              ↓
┌─────────────────────────────────────────────────────────────┐
│    ALLOCATE A BVID TO EACH CONNECTION REQUEST IN THE SET OF  │
│   CONNECTION REQUESTS SO THAT, ONCE THE SET OF CONNECTION    │
│    REQUESTS ARE SET UP IN THE PBB-TE NETWORK, CONFLICTING    │
│      CONNECTIONS IN THE PBB-TE NETWORK HAVE DIFFERENT BVIDS  │
│                             304                              │
└─────────────────────────────────────────────────────────────┘
```

FIG. 3

Minimize [$\sum \alpha_{ijk}$]:

*Constraints:*
1. Every connection request in the network should be assigned some BVID. The connection request is dropped if no BVID can be assigned to it.
    $$\forall\ T_{ijk} > 0\ (\ \sum_b \alpha^b_{ijk} = 1\ \text{or}\ \Delta_{ijk} > 0)$$
2. No two conflicting connection should be assigned the same BVID.
    $$\arg[\alpha^b_{ijk}] \neq \arg[\alpha^b_{i'jk'}]\ \text{if}$$
    - $\text{n}\ (\beta^g_{ijk} P^g_{ij}\ \cap\ \beta^{g'}_{i'jk'} P^{g'}_{i'j}) \geq 2$ and
    - $\Omega[\beta^g_{ijk} P^g_{ij},\ \beta^{g'}_{i'jk'} P^{g'}_{i'j}] \cap P^g_{ij} \neq$
    $\Omega[\beta^g_{ijk} P^g_{ij},\ \beta^{g'}_{i'jk'} P^{g'}_{i'j}] \cap P^{g'}_{i'j}$
3. The allocated BVID should be a positive integer value.
    $$\forall i:\ \alpha^b_{ijk} > 0\quad i = 1,2,...N$$

Infeasibility Constraint: The connection request is dropped if no BVID can be allocated to it.
$$\text{If}\ \alpha^b_{ijk} = 0\ \text{and}\ T_{ijk} > 1\ \text{then}\ \Delta_{ijk} = 1$$

Let $R(s_r, d_r, w_r)$ be a service request
Where, $s_r$ = source node, $d_r$ = destination node and $w_r$ = service granularity.
Let $G\{V,E,W\}$ be the actual physical network topology.
Let $\{e\} : w_e < w_r$
$G' = G - \{e\}$
$L_{sd}$ = shortest path between $(s,d)$
Let $B = \{$All BVIDs allocated on $L_{sd}\}$
For each $b_i$ in $B$
{
    Let $G_{b_i}$ be graph of all the links associated with BVID $b_i$
    $G'_{b_i} = G_{b_i} \cup L_{sd}$.
    If a cycle exists in $G'_{b_i}$ then discard $b_i$ and select the next BVID.
    Else return $b_i$.
}
If no valid BVID $\in B$ satisfies the required constraints
{
    If any node in $L_{sd}$ has $> \theta$ BVIDs then calculate next shortest path (that excludes node(s) in $L_{sd}$ with $> \theta$ BVIDs) between $s_r$ and $d_r$.
    Else select any $b_i : b_i \in B$.
}

METHOD AND APPARATUS FOR ALLOCATING BACKBONE VLAN IDENTIFIERS

RELATED APPLICATION

This application claims priority to Indian Patent Application No. 2165/MUM/2011, entitled "Method and Apparatus for Allocating Backbone VLAN Identifiers," by inventors Deval A. Bhamare and Ashwin Gumaste, filed 29 Jul. 2011, the contents of which are incorporated by reference herein.

BACKGROUND

1. Technical Field

This disclosure relates to computer networking. More specifically, this disclosure relates to methods and apparatus for allocating backbone VLAN identifiers.

2. Related Art

Carrier Ethernet is being heralded as the next major innovation in transport and is being sought after in both the enterprise and the service provider worlds. Conventional Ethernet relies on the principle of Medium Access Control (MAC) address learning and Spanning Tree Protocol (STP) to enable end-to-end communication. Given the absence of any priority information in Ethernet frames and the likelihood of huge spanning trees, the IEEE (Institute of Electrical and Electronic Engineers) 802.1Q standard was introduced to allow an Ethernet domain to be subdivided into smaller broadcast domains called VLANs (Virtual Local Area Networks). A VLAN tag can support 8 QoS (Quality of Service) levels. A single VLAN can have 12-bits to denote the VLAN identifier (VID) resulting in 4096 (effectively 4094 with 2 reserved) tags, and 3-bits to denote 8 priority levels. Since the VID is only 12 bits, the service provider network can only support 4094 unique service instances.

Customers connected to a service provider 802.1Q network may also have their own VLANs (within customer premises). To overcome the limited size of the VID, some networks use stacked VLAN tags—one tag for the customer (also known as the CTAG) and one for the service provider (also known as the STAG). The IEEE 802.1ad standard, which is also known as the Q-in-Q standard, specifies how tags can be stacked.

Although Q-in-Q helps solve the problem of demarcation between customers and providers VLANs, the problem of security from the service provider's perspective still persists as the provider has to learn the customer's MAC address, thus exposing the providers' edge and core bridges to potential MAC security violations.

To facilitate proper demarcation between the customer and the provider, the IEEE 802.1ah or provider-backbone-bridging standard was introduced, which allows a Q-in-Q frame that includes a CTAG from the customer and an STAG from the service provider to be fully encapsulated in a provider backbone bridged frame with a Backbone Service Instance ID (I-SID), provider network specific VLAN-ID (also known as a backbone VLAN identifier or BVID) and Backbone MAC (BMAC).

SUMMARY

Some embodiments disclosed herein provide methods and apparatuses for allocating backbone virtual local area network identifiers (BVIDs) to connection requests in a provider backbone bridging-traffic engineering (PBB-TE) network. During operation, a system (e.g., a network management system) can receive a set of connection requests for a set of connections that are desired to be set up in the PBB-TE network. Next, the system can allocate a BVID to each connection request in the set of connection requests so that, once the set of connection requests are set up in the PBB-TE network, conflicting connections in the PBB-TE network have different BVIDs.

According to one definition, a first connection conflicts with a second connection if the first and second connections have the same destination node and the paths associated with the first and second connections have at least one common intermediate node such that portions of the paths from the common intermediate node to the destination node do not have the same set of nodes.

In some embodiments, the system can allocate a BVID to each connection request in the set of connection requests by constructing a constrained optimization problem which when solved results in an assignment of BVIDs to the set of connection requests. Next, the system can determine a solution to the constrained optimization problem. The system can then allocate BVIDs to the set of connection requests based on the solution to the constrained optimization problem.

In some embodiments, the system can allocate a BVID to each connection request in the set of connection requests by determining a path (e.g., a shortest path) from a source node to a destination node associated with the connection request. In some embodiments the path can be a shortest path from the source node to the destination node. Next, the system can select a BVID and determine a sub-network of the PBB-TE network such that each link in the sub-network carries one or more connections that are associated with the selected BVID. In some embodiments, the system can preferentially select BVIDs that have been allocated to existing connections in the PBB-TE network. The system can then determine a second sub-network by performing a union of the path and the first sub-network. Next, the system can check whether or not the second sub-network contains a cycle. If the second sub-network does not contain a cycle, the system can allocate the selected BVID to the connection request. On the other hand, if the second sub-network contains a cycle, the system can select another BVID and repeat the process.

In this disclosure, unless otherwise stated, the term "based on" means "based solely or partly on."

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Computer Networks

Computer networking is typically accomplished using a layered software architecture, which is often referred to as a networking stack. Each layer is usually associated with a set of protocols which define the rules and conventions for processing packets in that layer. Each lower layer performs a service for the layer immediately above it to help with processing packets. The Open Systems Interconnection (OSI) model defines a seven layered network stack.

At a source node, each layer typically adds a header as the payload moves from higher layers to lower layers through the source node's networking stack. A destination node typically performs the reverse process by processing and removing headers of each layer as the payload moves from the lowest layer to the highest layer at the destination node.

A network can include nodes that are coupled by links in a regular or arbitrary mesh topology. A networking stack may include a link layer (layer 2 in the OSI model) and a network layer (layer 3 in the OSI model). The link layer (e.g., Ethernet) may be designed to communicate packets between nodes that are coupled by a link, and the network layer (e.g., Internet Protocol or IP for short) may be designed to communicate packets between any two nodes within a network.

A device that makes forwarding decisions based on information associated with the link layer is sometimes called a switch. A device that makes forwarding decisions based on information associated with the network layer is sometimes called a router. The terms "switch" and "router" are used in this disclosure interchangeably to refer to a device that is capable of making forwarding decisions based on information associated with the link layer and/or the network layer.

Unless otherwise stated, the term "IP" refers to both "IPv4" and "IPv6" in this disclosure. The use of the term "frame" is not intended to limit the disclosed embodiments to the link layer, and the use of the term "packet" is not intended to limit the disclosed embodiments to the network layer. In this disclosure, terms such as "frame," "packet," "cell," "datagram" etc. are generally intended to refer to a group of bits.

BVID

Figure 1:
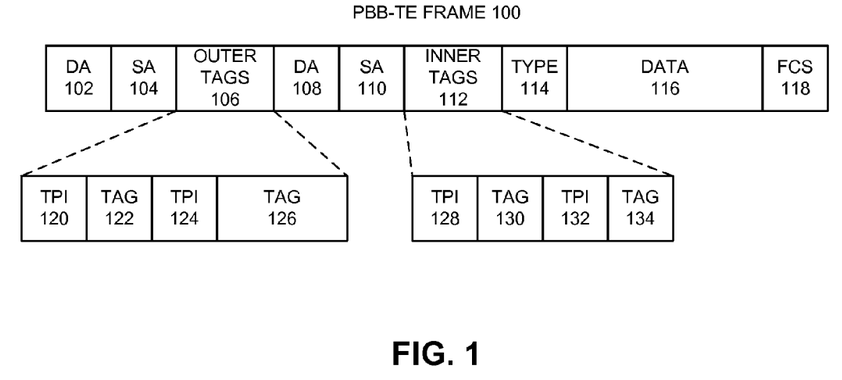
FIG. 1 illustrates an example of a PBB-TE frame in accordance with some embodiments described in this disclosure.

FIG. 1 illustrates an example of a PBB-TE frame in accordance with some embodiments described in this disclosure.

PBB-TE frame 100 can include outer destination address 102, outer source address 104, outer tags 106, inner destination address 108, inner source address 110, inner tags 112, protocol type 114, data 116, and frame check sequence 118.

Outer destination address 102 and outer source addresses 104 can be Ethernet MAC addresses of the destination and source nodes, respectively, in the PBB-TE network. Inner destination address 108 and inner source address 110 can be Ethernet MAC addresses of the destination and source nodes, respectively, in the customer network. Protocol type 114 can indicate the type of payload that is being carried in data 116.

Outer tags 106 and inner tags 112 can each include pairs of tag protocol identifiers and tags. For example, outer tags 106 can include tag protocol identifiers 120 and 124, and tags 122 and 126. A tag protocol identifier (TPI) indicates the type of tag that follows the tag protocol identifier. For example, TPI 120 may indicate that tag 122 is a provider network specific tag which includes a 3-bit priority control point (PCP) field, a 1-bit canonical form indicator (CFI) field, and a 12-bit BVID. TPI 124 can indicate that the tag 126 is a service instance tag which includes, among other fields, a 24-bit service instance identifier (ISID). TPI 128 can indicate that tag 130 is a service provider tag (STAG) that includes PCP and CFI bits and a service provider VLAN-ID. TPI 132 can indicate that tag 134 is a customer tag (CTAG) that includes PCP and CFI bits and a customer VLAN-ID.

In some embodiments, at each node (e.g., switch or bridge) of the PBB-TE network, PBB-TE frame 100 can be forwarded based on a 60-bit value that includes the 48-bit outer destination address 102 and the 12-bit BVID in tag 122.

In some embodiments, the generation of a BVID depends on an ISID that is service-specific and unique across the network. Note that the ISID is a 24-bit VID (as opposed to the CTAG, STAG or BVID which are all 12-bit values). The ISID maps a service to a network specific VID, but for forwarding purposes, the ISID needs to be mapped to 12-bit BVID that can be used by a generic switch (one that is backward compatible with 802.1Q). The BVID along with the BMAC address is used by switches for forwarding purposes leading to a network-wide unique 60-bit address. Multiple ISIDs may be mapped to a BVID because the number of BVIDs is restricted to 4094.

PBB-TE is a standard that is related to an important enabling technology for Carrier Ethernet. PBB-TE makes use of the existing Ethernet internetworking, switching and bridging architecture to create a new carrier-grade transport philosophy. In conventional PBB-TE networks, MAC learning and STP (Spanning Tree Protocol) are both disabled and BVIDs are assigned manually. Since a BVID is 12-bit long, a network can only have 4094 distinct BVIDs. To conserve BVIDs, the BVIDs are often reused, i.e., several ISIDs are mapped to a single BVID.

If the BVIDs are not allocated efficiently and consistently, it can create serious routing and management problems in the network. Some embodiments described in this disclosure provide methods and apparatuses for automatically, efficiently, and consistently allocating BVIDs in a PBB-TE network.

In a PBB-TE network, communication can occur based on managed paths. These managed paths can be provisioned using a Network Management System (NMS) based control plane as opposed to legacy Ethernet, where the paths are provisioned automatically through STP. The managed paths are identified at a switching node—either an edge or a core backbone bridge—using a 60-bit address that consists of a 12-bit BVID and a 48-bit BMAC. The mechanism for provisioning managed paths enables PBB-TE to ensure deterministic delay and 50 ms protection switching.

Apart from providing managed services, provisioning managed paths also facilitates creation of multiple paths between the same source and destination nodes. Multiple paths may be necessary when we consider the issue of provisioning more than one service request between same source and destination pair. The different services may or may not follow the same path from the source to the destination. In such cases, each service is provisioned on a different path for the same source-destination pair. These multiple provisioned paths may pass through a common intermediate node (e.g., bridge or switch).

Figure 2A:
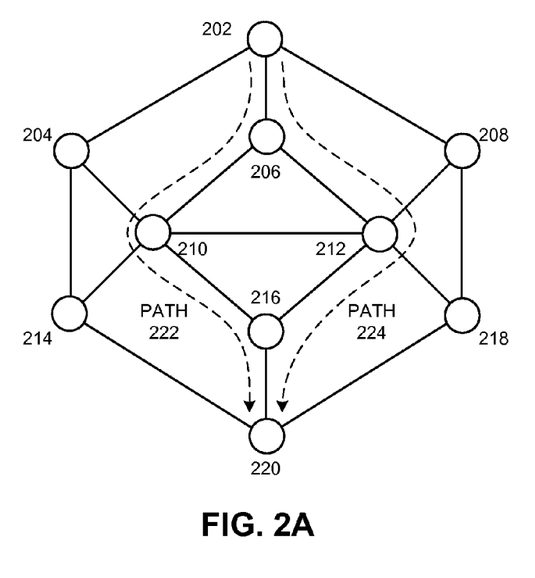
FIG. 2A illustrates how multiple paths between the same source-destination pair can pass through a common intermediate node.

FIG. 2A illustrates how multiple paths between the same source-destination pair can pass through a common intermediate node.

Nodes 202-220 can be part of a network. The network can have two connections between nodes 202 and 220 along paths 222 and 224. Note that paths 222 and 224 pass through common intermediate nodes 206 and 216.

Another case of interest is when two services are requested from different source nodes to the same destination node, and paths provisioned for these services pass through a common intermediate node.

Figure 2B:
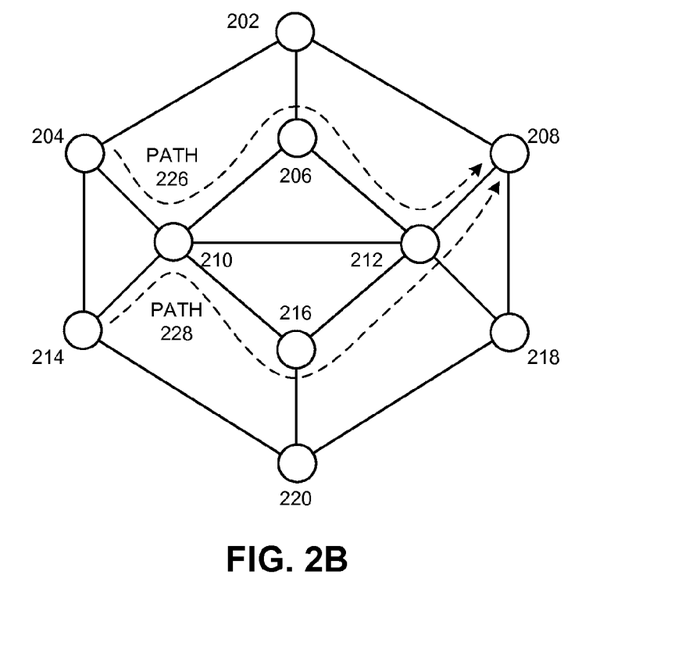
FIG. 2B illustrates how two paths from different source nodes to the same destination node can pass through a common intermediate node.

FIG. 2B illustrates how two paths from different source nodes to the same destination node can pass through a common intermediate node.

The network can have two connections between source nodes 204 and 214 and destination node 208. The connection between source node 204 and destination node 208 can be routed along paths 226. The connection between source node 214 and destination node 208 can be provisioned along paths 228. Note that paths 226 and 228 pass through common intermediate nodes 210 and 212.

To provision the paths illustrated in FIGS. 2A and 2B, a BVID is assigned to each one of them. Given the limited number of BVIDs in a network, there is a need to reuse the same BVID across multiple paths. Note that using the same BVID across multiple paths still allows us to have a unique 60-bit BMAC+BVID address, since the 48-bit BMAC is globally unique. Another common practice in traffic-engineered networks is to allocate a small number of dedicated BVIDs to each switch. This reduces the size of the forwarding tables.

Some embodiments described herein are based on the following insight: if the same BVID is used to provision multiple paths between the same source-destination pair, and further, if the paths cross or share the same set of links, a serious switching problem may occur that would result in the failure of the PBB-TE system.

For example, nodes 206 and 216 shown in FIG. 2A may forward Ethernet frames based on the destination MAC and BVID. Specifically, the forwarding table in nodes 206 and 216 may have one entry for every unique pair of destination MAC and BVID values. However, if paths 222 and 224 use the same BVID, the forwarding table in nodes 206 and 216 will store the forwarding entry for only one of those two paths, which will create a serious switching problem, namely, the traffic in one of the two paths will be misrouted. A similar problem occurs in the situation shown in FIG. 2B if paths 226 and 228 have the same BVID.

Process for Allocating BVIDs

To avoid this issue of assigning the same BVID to multiple paths heading to a common destination, some embodiments described in this disclosure provide methods and apparatuses to automatically allocate BVIDs in a consistent and efficient manner. Further, some embodiments described in this disclosure minimize the number of unique BVIDs required in the network so as to provision the maximum amount of traffic in the network.

According to one definition, two connections C1 and C2 are said to be conflicting if (1) C1 and C2 have the same destination node, and (2) C1 and C2 have one or more common intermediate nodes (i.e., other than the source or destination nodes) on the paths allocated to them, and (3) the portion of the paths allocated to C1 and C2 after the first common node in the paths does not contain the same set of nodes. For example, paths 222 and 224 in FIG. 2A are conflicting and so are paths 226 and 228 in FIG. 2B. Some embodiments described in this disclosure ensure that no two conflicting connections are allocated the same BVID.

Figure 3:
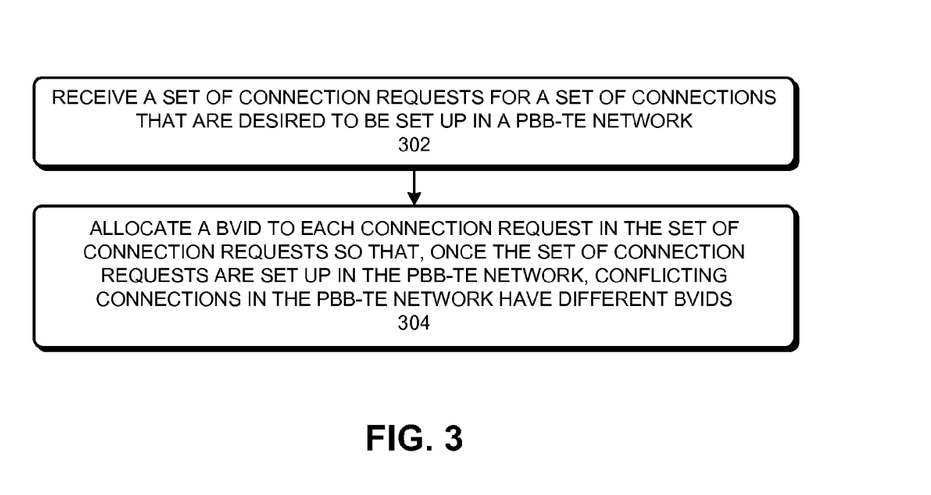
FIG. 3 illustrates a process for allocating BVIDs to connection requests in a network in accordance with some embodiments disclosed in this disclosure.

FIG. 3 illustrates a process for allocating BVIDs to connection requests in a network in accordance with some embodiments disclosed in this disclosure.

The process can begin with a system receiving a set of connection requests for a set of connections that are desired to be set up in a PBB-TE network (operation 302). Note that the PBB-TE network may already have existing connections that have BVIDs allocated to them.

Next, the system can allocate a BVID to each connection request in the set of connection requests so that, once the set of connection requests are set up in the PBB-TE network, conflicting connections in the PBB-TE network have different BVIDs (operation 304). As mentioned above, a first connection conflicts with a second connection if the first and second connections have the same destination node and the paths associated with the first and second connections have at least one common intermediate node such that portions of the paths from the common intermediate node to the destination node do not have the same set of nodes.

In some embodiments, the system can determine a path for a connection request and allocate a BVID to the path such that (1) the path is the shortest available path from the source to the destination that has the requested bandwidth, and (2) the number of connection requests that can be satisfied by the network is maximized.

Let $G=\{V, E, W\}$ be the graph representing the network topology, where V=set of vertices which represent the switches in the network, E=set of edges which represent the active links between switches, and W=capacity (e.g., total bandwidth) of each link. Let $c_i=i^{th}$ connection request between vertices s and d with bandwidth w, where s and d are in V and w≤max (W). Let B=set of BVIDs that can be allocated in the network.

Further, let $L_d^s$ be a potential path for connection request $c_i$, and let $B_d$=set of all the BVIDs associated with vertex d. For a given BVID b in $B_d$, let $L_d^b$=set of paths in $B_d$ that have been allocated the BVID b. In some embodiments, the system can correctly allocate a BVID to $c_i$ by comparing the potential path $L_d^s$ with all the previously provisioned paths terminating at the same destination node d. Specifically, for a given BVID b from $B_d$, the system can check if path $L_d^s$ conflicts with another path from $L_d^s$. If a conflict exists, BVID b cannot be allocated to connection request $c_i$ along path $L_d^s$. On the other hand, if there is no conflict, BVID b can be allocated to connection request $c_i$ along path $L_d^s$.

Figure 4A:
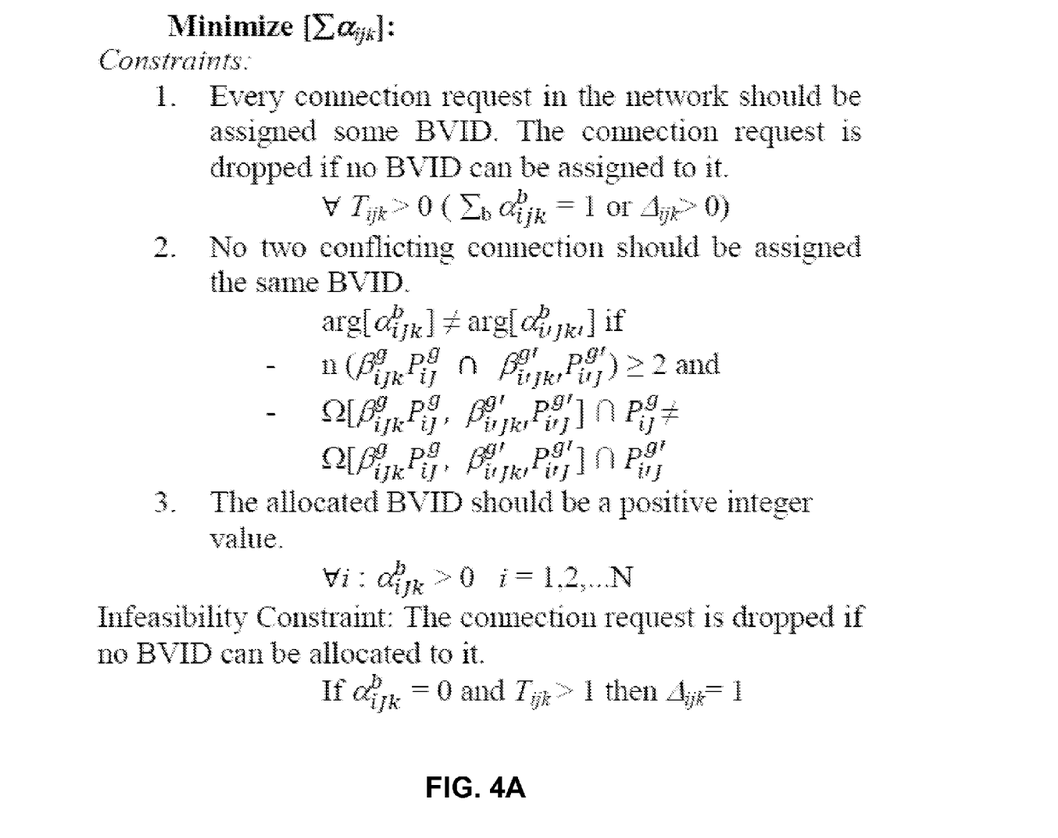
FIG. 4A illustrates a constrained optimization problem which when solved results in a consistent assignment of BVIDs to a set of connection requests in accordance with some embodiments described in this disclosure.

FIG. 4A illustrates a constrained optimization problem which when solved results in a consistent assignment of BVIDs to a set of connection requests in accordance with some embodiments described in this disclosure.

The notation used in the constrained optimization problem is as follows. Traffic between nodes i and j in the network for the $k^{th}$ service is denoted by $T_{ijk}$. B is the set of available BVIDs, and b is the BVID allocated to a path. $P_{ij}^g$ is the set of nodes along path g in the network between nodes i and j. $n(P_{ij}^g)$ is the number of nodes in $P_{ij}^g$. $\Omega[P_{ij}^g, P_{kj}^h]$ is the set of nodes on path g (from source i to destination j) and path h (from source k to destination j) from the first common node to destination node j when moving from source nodes i and k to destination node j. If there are no common nodes between paths g and h, then the set of nodes $\Omega[P_{ij}^g, P_{kj}^g]$ is empty. $\alpha_{ijk}^b$ and $\beta_{ijk}^g$ are variables of the constrained optimization problem. $\alpha_{ijk}{}^b$ is equal to 1 if BVID b is assigned to $T_{ijk}$, and is equal to 0 if BVID b is not assigned to $T_{ijk}$. $\beta_{ijk}{}^g$ is equal to 1 if path g is chosen, and is equal to 0 if path g is not chosen.

Figure 4B:
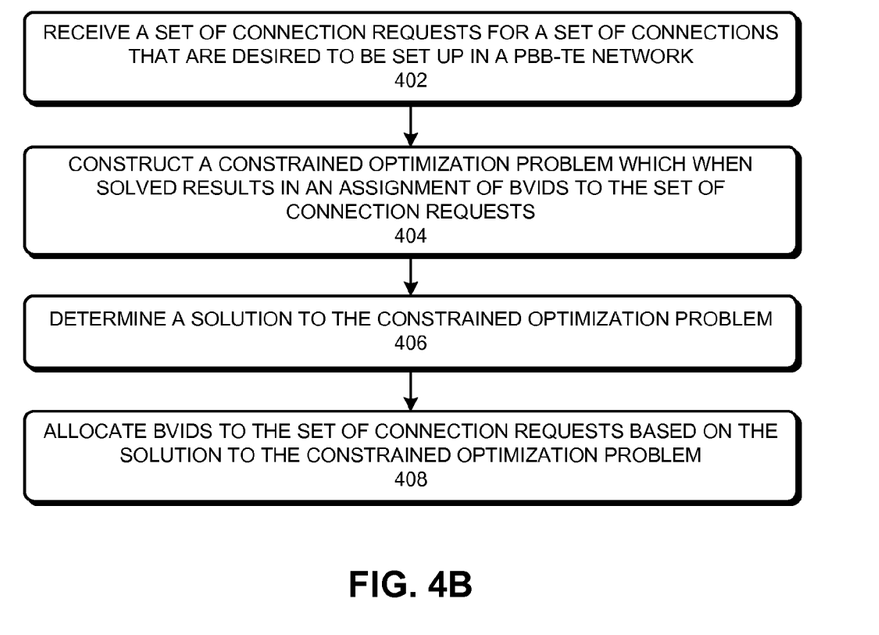
FIG. 4B illustrates a process for allocating BVIDs to connection requests in a network in accordance with some embodiments disclosed in this disclosure.

FIG. 4B illustrates a process for allocating BVIDs to connection requests in a network in accordance with some embodiments disclosed in this disclosure.

The process can begin with a system receiving a set of connection requests for a set of connections that are desired to be set up in a PBB-TE network (operation 402). Next, the system can construct a constrained optimization problem which when solved results in an assignment of BVIDs to the set of connection requests (operation 404). The system can then determine a solution to the constrained optimization problem (operation 406). Next, the system can allocate BVIDs to the set of connection requests based on the solution to the constrained optimization problem (operation 408).

Figure 5A:
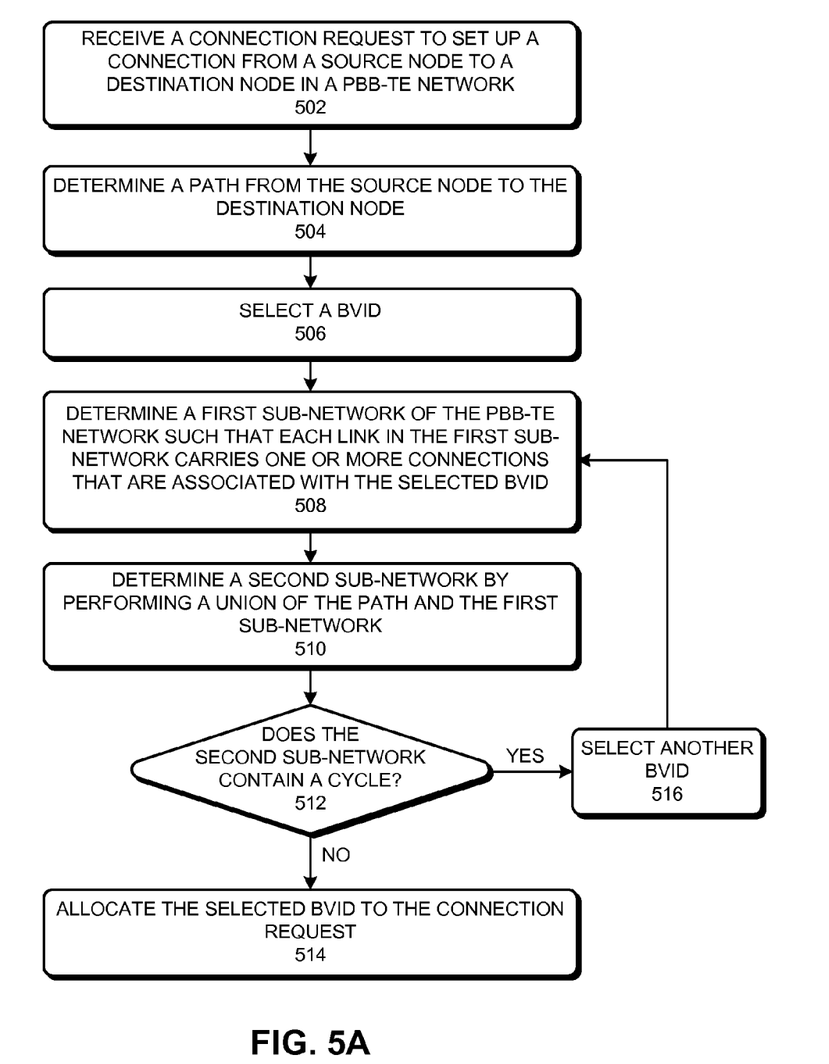
FIG. 5A illustrates a process for allocating BVIDs to connection requests in a network in accordance with some embodiments disclosed in this disclosure.

FIG. 5A illustrates a process for allocating BVIDs to connection requests in a network in accordance with some embodiments disclosed in this disclosure.

The process can begin with a system receiving a connection request from a source node to a destination node in a PBB-TE network (operation 502). Next, the system can determine a path from the source node to the destination node (operation 504). In some embodiments, the path can be a shortest path from the source node to the destination node. The system can then select a BVID (operation 506). In some embodiments, the system can preferentially select BVIDs that have been allocated to existing connections in the PBB-TE network. Next, the system can determine a first sub-network of the PBB-TE network such that each link in the first sub-network carries one or more connections that are associated with the selected BVID (operation 508). The system can then determine a second sub-network that is a union of the path and the first sub-network (operation 510). Next, the system can check whether the second sub-network contains a cycle (operation 512). If the second sub-network does not contain a cycle ("NO" branch), the system can allocate the selected BVID to the connection request (operation 514). On the other hand, if the second sub-network contains a cycle ("YES" branch), the system can select another BVID (operation 516), and return to operation 508.

Figure 5B:
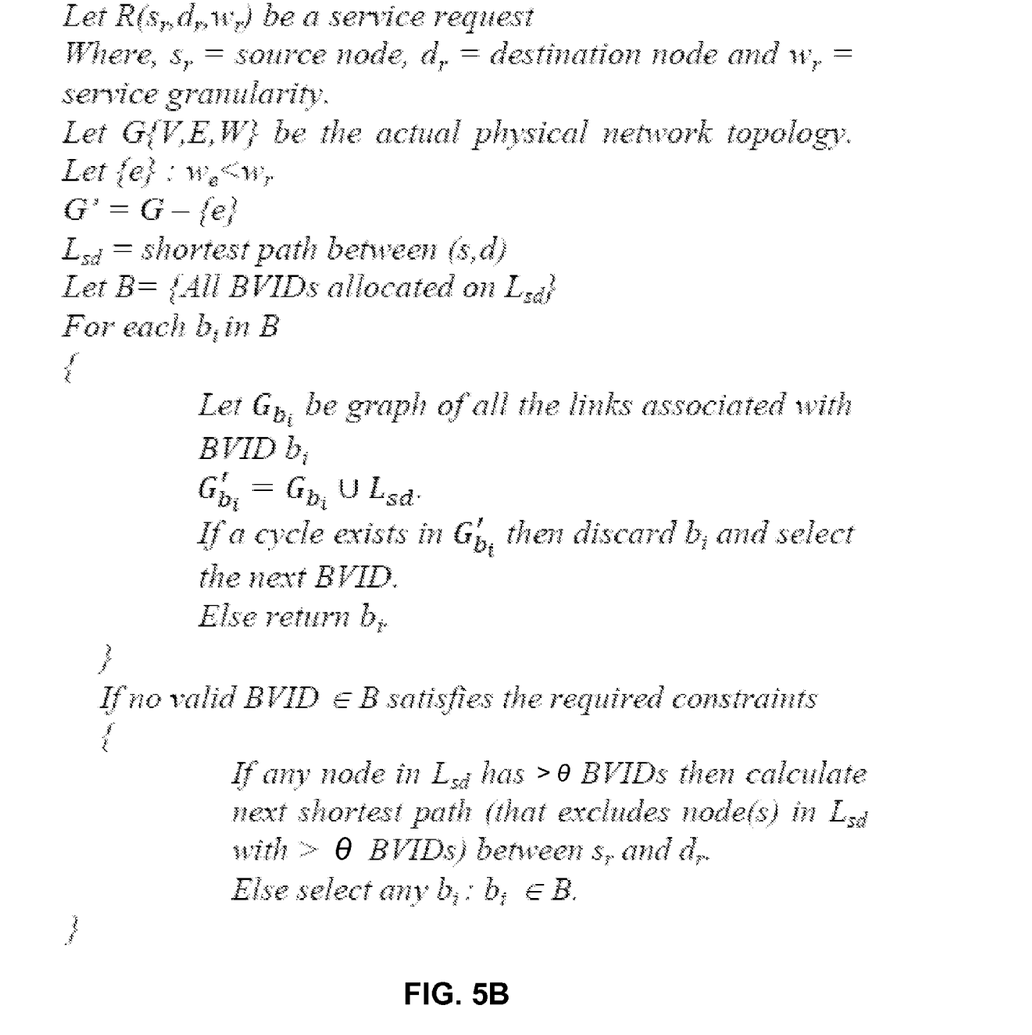
FIG. 5B presents pseudo-code that illustrates a process for allocating BVIDs to connection requests in a network in accordance with some embodiments disclosed in this disclosure.

FIG. 5B presents pseudo-code that illustrates a process for allocating BVIDs to connection requests in a network in accordance with some embodiments disclosed in this disclosure.

In the process illustrated in FIG. 5B, the system tries to reuse BVIDs as much as possible. For example, the system can first try to route the connection request over the shortest path and allocate a BVID that is currently in use. If no such BVID can be found, then the system can check whether routing the connection request over a different shortest path or a longer path (e.g., the second shortest path) allows the system to reuse a BVID. In particular, the system may select a longer path that does not pass through nodes in the network that are associated with more than a pre-determined number of BVIDs (e.g., ">θ BVIDs" as shown in FIG. 5B). In some embodiments, θ=32. If a BVID that is currently in use cannot be allocated to the connection request, then the system may select a new BVID (i.e., a BVID that is currently not in use) for the connection request.

Figure 6:
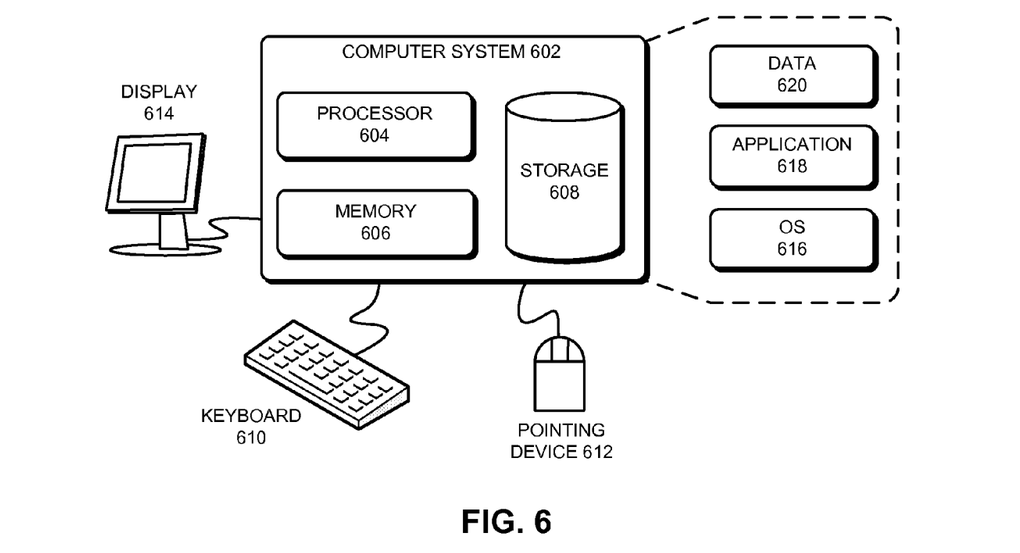
FIG. 6 illustrates a computer system in accordance with some embodiments described in this disclosure.

FIG. 6 illustrates a computer system in accordance with some embodiments described in this disclosure.

A computer system can generally include any device that is capable of performing computations. Specifically, a computer system, such as computer system 602, can include processor 604, memory 606, and storage device 608. Computer system 602 can be coupled to display device 614, keyboard 610, and pointing device 612. Storage device 608 can store operating system 616, application 618, and data 620. Data 620 can include a description of a PBB-TE network and a set of connection requests. Application 618 can include network management software.

Computer system 602 may automatically perform any method that is implicitly or explicitly described in this disclosure. Specifically, during operation, computer system 602 can load application 618 into memory 606. Application 618 can then allocate BVIDs to a set of connection requests. Specifically, in some embodiments, application 618 can allocate BVIDs using the processes illustrated in FIGS. 3, 4B, 5A and/or 5B.

The data structures and code described in this disclosure can be partially or fully stored on a non-transitory computer-readable storage medium and/or a hardware mechanism and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data.

Embodiments described in this disclosure can be implemented in ASICs, FPGAs, dedicated or shared processors, and/or other hardware modules or apparatuses now known or later developed. Specifically, the methods and/or processes may be described in a hardware description language (HDL) which may be compiled to synthesize register transfer logic (RTL) circuitry which can perform the methods and/or processes. Embodiments described in this disclosure may be implemented using purely optical technologies. The methods and processes described in this disclosure can be partially or fully embodied as code and/or data stored in a computer-readable storage medium or device, so that when a computer system reads and/or executes the code and/or data, the computer system performs the associated methods and processes.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A method for allocating backbone virtual local area network identifiers (BVIDs) to connection requests in a provider backbone bridging-traffic engineering (PBB-TE) network, the method comprising:
  receiving a set of connection requests for a set of connections that are desired to be set up in the PBB-TE network; and
  allocating a BVID to each connection request in the set of connection requests so that, once the set of connection requests are set up in the PBB-TE network, conflicting connections in the PBB-TE network have different BVIDs, wherein said allocating comprises:
    determining a path from a source node to a destination node associated with the connection request;
    selecting a BVID;
    determining a first sub-network of the PBB-TE network such that each link in the first sub-network carries one or more connections that are associated with the selected BVID;

determining a second sub-network by performing a union of the path and the first sub-network; and in response to determining that the second sub-network does not contain a cycle, allocating the selected BVID to the connection request.

2. The method of claim 1, wherein a first connection conflicts with a second connection if the first and second connections have the same destination node, and the paths associated with the first and second connections have at least one common intermediate node such that portions of the paths from the common intermediate node to the destination node do not have the same set of nodes.

3. The method of claim 1, wherein the path is a shortest path from the source node to the destination node.

4. The method of claim 1, wherein selecting the BVID includes preferentially selecting BVIDs that have been allocated to existing connections in the PBB-TE network.

5. A non-transitory tangible computer-readable storage medium encoded with a computer program that, when executed by a computer, causes the computer to perform a method for allocating backbone virtual local area network identifiers (BVIDs) to connection requests in a provider backbone bridging-traffic engineering (PBB-TE) network, the method comprising:

receiving a set of connection requests for a set of connections that are desired to be set up in the PBB-TE network; and allocating a BVID to each connection request in the set of connection requests so that, once the set of connection requests are set up in the PBB-TE network, conflicting connections in the PBB-TE network have different BVIDs, wherein said allocating comprises:

determining a path from a source node to a destination node associated with the connection request;

selecting a BVID;

determining a first sub-network of the PBB-TE network such that each link in the first sub-network carries one or more connections that are associated with the selected BVID;

determining a second sub-network by performing a union of the path and the first sub-network; and in response to determining that the second sub-network does not contain a cycle, allocating the selected BVID to the connection request.

6. The non-transitory tangible computer-readable storage medium of claim 5, wherein a first connection conflicts with a second connection if the first and second connections have the same destination node, and the paths associated with the first and second connections have at least one common intermediate node such that portions of the paths from the common intermediate node to the destination node do not have the same set of nodes.

7. The non-transitory tangible computer-readable storage medium of claim 5, wherein the path is a shortest path from the source node to the destination node.

8. The non-transitory tangible computer-readable storage medium of claim 5, wherein selecting the BVID includes preferentially selecting BVIDs that have been allocated to existing connections in the PBB-TE network.

9. An apparatus, comprising:

a processor; and a non-transitory processor-readable storage medium storing instructions that are capable of being executed by the processor, the instructions comprising:

instructions for receiving a set of connection requests for a set of connections that are desired to be set up in the PBB-TE network; and instructions for allocating a BVID to each connection request in the set of connection requests so that, once the set of connection requests are set up in the PBB-TE network, conflicting connections in the PBB-TE network have different BVIDs, wherein said allocating comprises:

determining a path from a source node to a destination node associated with the connection request;

selecting a BVID;

determining a first sub-network of the PBB-TE network such that each link in the first sub-network carries one or more connections that are associated with the selected BVID;

determining a second sub-network by performing a union of the path and the first sub-network; and in response to determining that the second sub-network does not contain a cycle, allocating the selected BVID to the connection request.

10. The apparatus of claim 9, wherein a first connection conflicts with a second connection if the first and second connections have the same destination node, and the paths associated with the first and second connections have at least one common intermediate node such that portions of the paths from the common intermediate node to the destination node do not have the same set of nodes.

11. The apparatus of claim 9, wherein the path is a shortest path from the source node to the destination node.

12. The apparatus of claim 9, wherein instructions for selecting the BVID includes instructions for preferentially selecting BVIDs that have been allocated to existing connections in the PBB-TE network.

* * * * *